(12) United States Patent
Son

(10) Patent No.: US 7,536,207 B2
(45) Date of Patent: May 19, 2009

(54) MOBILE TERMINAL HAVING ROUND EXTERNAL SPEAKER

(75) Inventor: Sung-Su Son, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 516 days.

(21) Appl. No.: 11/184,386

(22) Filed: Jul. 18, 2005

(65) Prior Publication Data

US 2006/0019719 A1 Jan. 26, 2006

(30) Foreign Application Priority Data

Jul. 20, 2004 (KR) .................... 10-2004-0056572

(51) Int. Cl.
*H04M 1/00* (2006.01)
*H04B 1/08* (2006.01)
*H04B 1/38* (2006.01)

(52) U.S. Cl. ................ 455/569.1; 455/550.1; 455/90.1; 455/350

(58) Field of Classification Search .............. 455/569.1, 455/550.1, 575.1, 90.1–90.3, 350, 3.06, 66.1; 381/59, 89, 332–336, 111, 117, 386–388

See application file for complete search history.

(56) References Cited

U.S. PATENT DOCUMENTS

| | | | | |
|---|---|---|---|---|
| 4,450,495 A | * | 5/1984 | Naruki | 360/137 |
| 6,665,416 B1 | * | 12/2003 | Choi | 381/412 |
| 7,003,130 B2 | * | 2/2006 | Chung | 381/396 |
| 2006/0098838 A1 | * | 5/2006 | Yoo | 381/398 |

FOREIGN PATENT DOCUMENTS

| | | |
|---|---|---|
| CN | 1353564 | 6/2002 |
| JP | 2003-263241 | 9/2003 |
| KR | 1989-0002637 | 4/1989 |

* cited by examiner

*Primary Examiner*—Eugene Yun
(74) *Attorney, Agent, or Firm*—Lee, Hong, Degerman, Kang & Waimey

(57) ABSTRACT

Disclosed is a mobile terminal having a round external speaker. The round external speaker can be easily and simply mounted on the mobile terminal without a separate mounting unit by inserting a mounting protrusion portion of the mobile terminal into a mounting groove portion.

10 Claims, 3 Drawing Sheets

MOBILE TERMINAL HAVING ROUND EXTERNAL SPEAKER

Pursuant to 35 U.S.C. § 119(a), this application claims the benefit of earlier filing date and right of priority to Korean Patent Application No. 56572/2004, filed on Jul. 20, 2004, the content of which is hereby incorporated by reference herein in its entirety.

BACKGROUND OF THE INVENTION

1. Field of the Invention

The present invention relates to a mobile terminal having a round external speaker, and particularly, to a mobile terminal having a round external speaker capable of facilitating to mount the round external speaker at the mobile terminal.

2. Description of the Related Art

Speakers are being widely used in mobile terminals and all kinds of electronic devices. The speaker has been reduced in size.

FIG. 1 is a longitudinal sectional view illustrating an external speaker of a conventional mobile terminal.

As shown therein, in an external speaker 10 of a conventional mobile terminal, a yoke 12 is coupled inside a frame 11.

A magnet 13 is installed on the yoke 12, and a plate 14 is installed on the magnet 13.

In addition, a protector 18 is installed outside the frame 11 and a plurality of holes 19 are formed on the protector 18.

A vibration plate 15 is installed at a space formed between the plate 14 and the protector 18. A Voice coil 16 is formed on the vibration plate 15. External connectors 17 to be connected to a main body (not illustrated) of the mobile terminal are installed on the voice coil 16.

In the external speaker of the conventional mobile terminal, if power of the mobile terminal (not illustrated) is supplied to the speaker 10 through the external connectors 17, the voice coil 16 magnetized according to current intensity is moved according to a magnetic flow of the magnet 13 and vibrates the vibration plate 15. Here, a sound is made by sound pressure generated by the vibration of the vibration plate 15.

However, in the external speaker of the conventional mobile terminal, when a speaker is mounted on the mobile terminal, the speaker must be attached to the side of the main body of the mobile terminal by using a separate mounting unit.

In addition, when the main body of the mobile terminal is curvedly formed as the present mobile terminal is being in fashion, it is difficult to mount the speaker on the side of the main body of the mobile terminal. Besides, even though the speaker is mounted on the side of the main body of the mobile terminal, the speaker fails to be firmly mounted on the side of the main body of the mobile terminal before long and finally is separated therefrom.

SUMMARY OF THE INVENTION

Therefore, an object of the present invention is to provide a mobile terminal having a round external speaker, in which the speaker can be easily and simply mounted on the side of a main body of the mobile terminal by using mounting protrusion portions formed at both sides of the mobile terminal and mounting groove portions formed inside the speaker.

To achieve these and other advantages and in accordance with the purpose of the present invention, as embodied and broadly described herein, there is provided a mobile terminal having an external speaker comprising: a mounting protrusion portion formed at one ore more sides of a main body of the mobile terminal; and a round external speaker having a mounting groove portion therein in order to be coupled with the mounting protrusion portion.

To achieve these and other advantages and in accordance with the purpose of the present invention, as embodied and broadly described herein, there is provided an external speaker comprising: a round yoke installed inside a frame; a round magnet installed on the round yoke; a round plate installed on the round magnet for fixing the round magnet on the round yoke; a round protector installed outside the frame and having a plurality of holes in the middle thereof; a round vibration plate installed between the round protector and the round plate; and a voice coil installed on the vibration plate.

Preferably, external connectors to be connected to the main body of the mobile terminal is formed at a voice coil.

Preferably, coupling grooves are formed at both sides of the frame and coupling hooks are formed on the ends of the round protector in order to be inserted into each coupling groove.

Preferably, a first fixing portion of the round yoke is insertedly coupled with a coupling jaw formed inside the frame.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to a mobile terminal having a round external speaker in accordance with the present invention, examples of which are now illustrated in the accompanying drawings.

Figure 1:
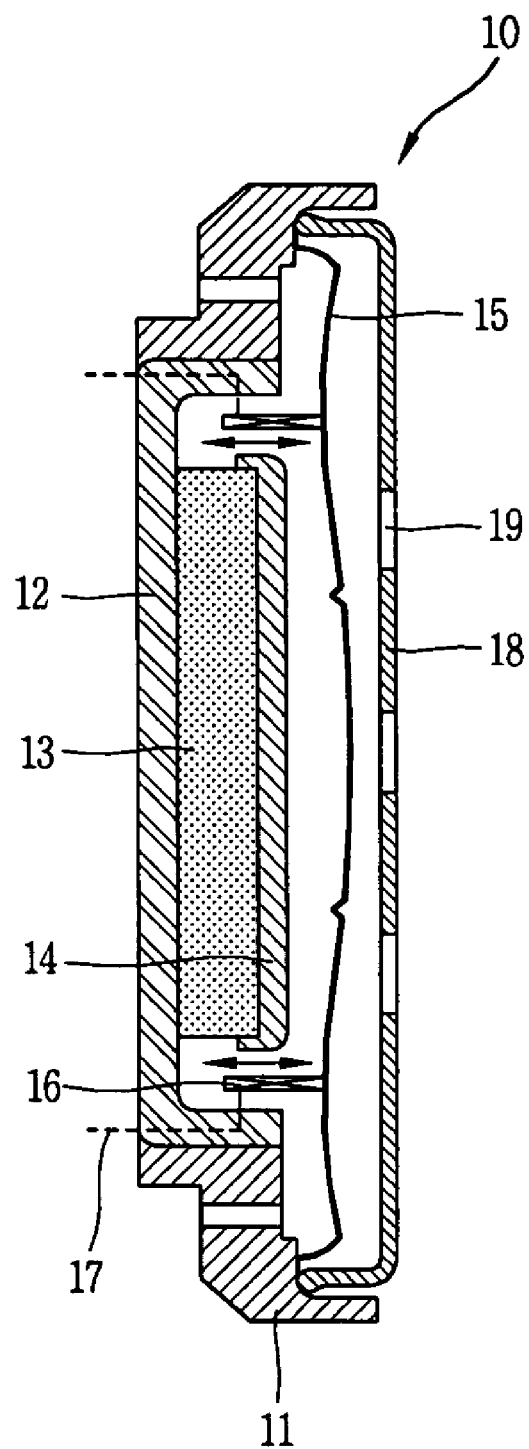
FIG. 1 is a longitudinal sectional view illustrating a round external speaker of a conventional mobile terminal.
Figure 2:
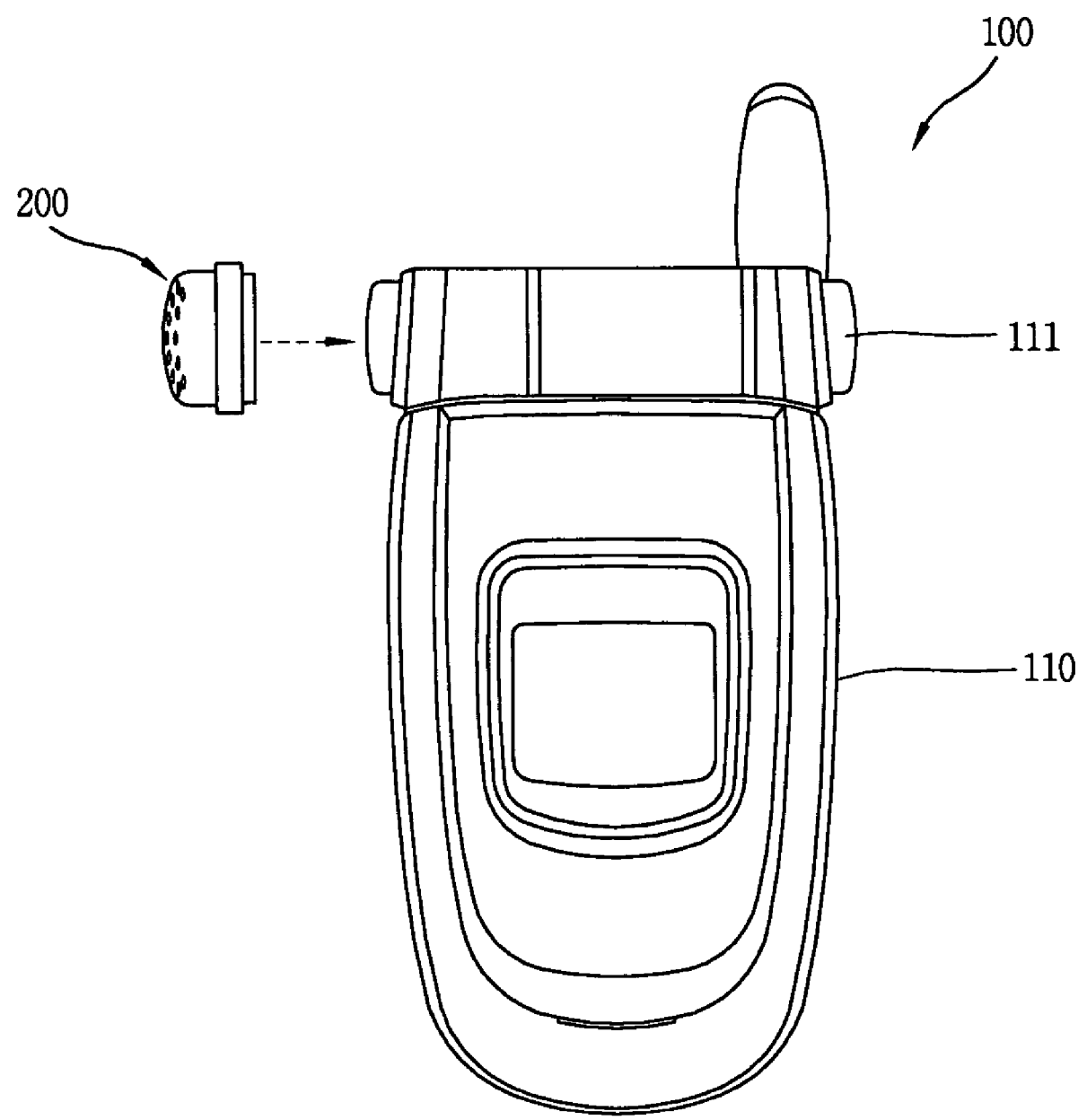
FIG. 2 is a front view illustrating a mobile terminal having a round external speaker in accordance with the present invention.

FIG. 2 is a front view illustrating a mobile terminal having a round external speaker according to the present invention.

As shown therein, a mobile terminal 100 having a round external speaker has mounting protrusion portions 111 having a round shape on both sides of a main body 110. A mounting groove portion 222 corresponding to each mounting protrusion portion 111 is formed on the side of a round external speaker 200.

In the mobile terminal 100 having a round external speaker according to the present invention, the mounting protrusion portion 111 and the mounting groove portion 222 are linearly aligned and then the mounting protrusion portion 111 is fitted and inserted into the mounting groove portion 222. Here, both ends of the mounting groove portion 222 are elastically transformed such that the mounting protrusion portion 111 can be inserted securely into the mounting groove portion 222.

Figure 3:
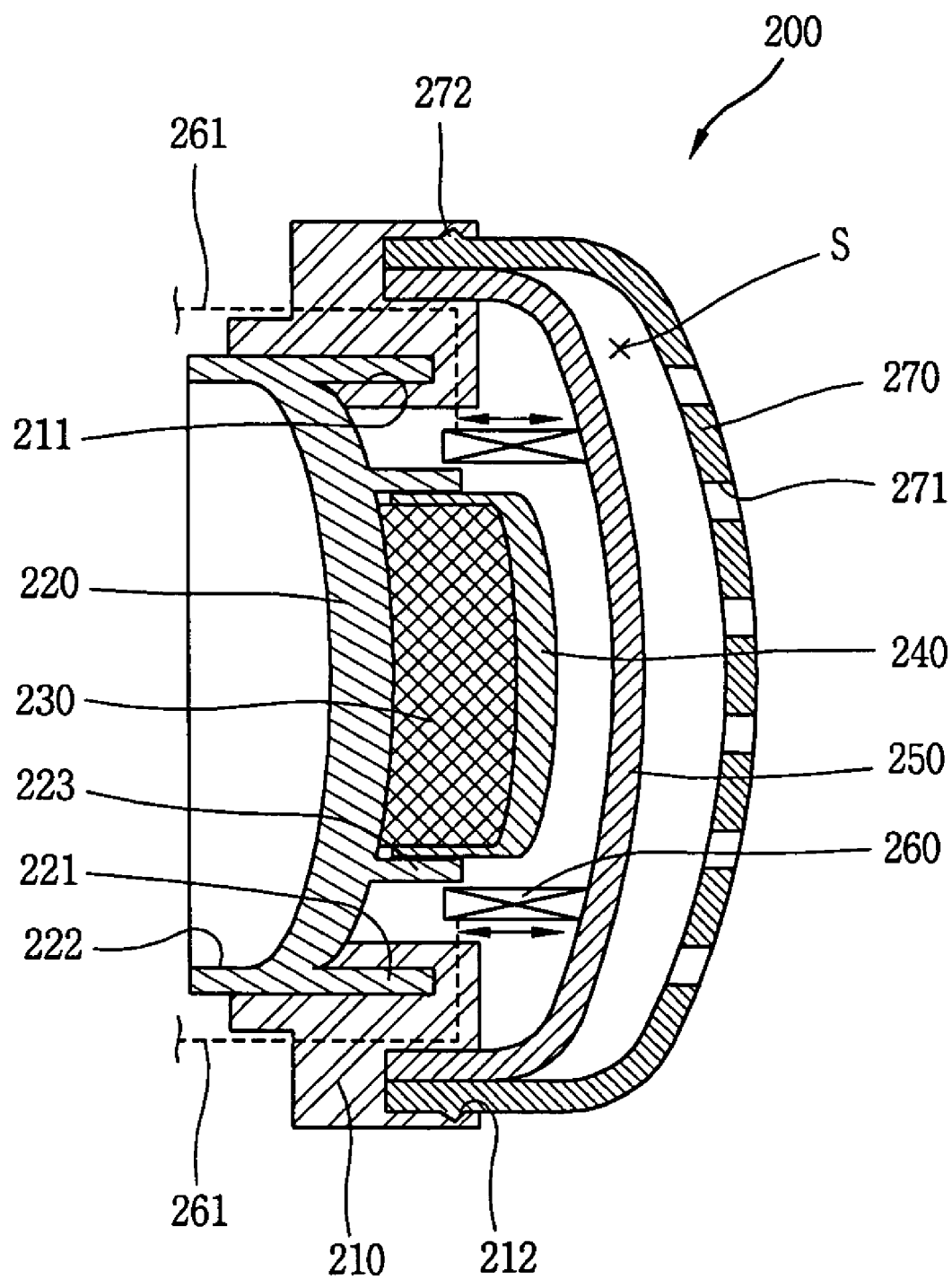
FIG. 3 is a longitudinal sectional view illustrating a round external speaker in accordance with the present invention.

FIG. 3 is a longitudinal sectional view illustrating a round external speaker in accordance with the present invention.

As shown therein, the round external speaker 200 in accordance with the present invention includes: a round yoke 220 installed inside a frame 210; a round magnet 230 installed on the round yoke 220; a round plate 240 installed on the round magnet 230 for fixing the round magnet on the round yoke; a round protector 270 installed outside the frame 210 and having a plurality of holes 271 formed in the middle thereof; a vibration plate 250 installed between the round protector 270 and the round plate 240; and a voice coil 260 installed on the vibration plate 250.

In other words, the round yoke 220 having the round mounting groove portion 222 is coupled in the middle of the frame 210.

Here, a first fixing portion 221 of the round yoke 220 is insertedly coupled with a coupling jaw 211 formed inside the frame 210.

The round magnet 230 is installed on the outside of the round yoke 220, and the round plate 240 is installed on the outside of the round magnet 230 for fixing the round magnet 230 on the round yoke 220.

A second fixing portion 223 formed on the outside of the round yoke 220 is provided such that the round magnet 230 and the round plate 240 are fixed to the round yoke 220.

The protector 270 is fixed to the outside of the frame 210. Coupling grooves 212 are formed at both sides of the frame 210, and a coupling hooks 272 are formed on the end of the round protector 270 in order to be inserted into each coupling groove 212. A plurality of holes 271 are formed in the middle of the protector 270.

The round vibration plate 250 is installed at a space (S) formed by the round plate 240 and the protector 270. The voice coil 260 is formed on the vibration plate 250. External connectors 261 to be connected to the main body 110 of the mobile terminal 100 are formed on the voice coil 260.

In the round external speaker 200 in accordance with the present invention, since the mounting groove portion 222 is formed at the side of the round yoke 220, the mounting protrusion portion 111 can be inserted into the mounting groove portion 222. Accordingly, without a separate mounting unit, the round external speaker 200 can be easily and simply mounted on the mobile terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal having a round external speaker unit mountable on the mobile terminal, comprising:
   a mounting protrusion portion on at least one side of a main body of the mobile terminal; and
   a round external speaker unit having a mounting groove portion therein configured for coupling the round external speaker unit to the mounting protrusion portion,
   wherein the mounting protrusion portion is inserted and fitted into the mounting groove portion.

2. The terminal of claim 1, wherein the round external speaker unit comprises:
   a round yoke installed inside a frame;
   a round magnet installed on the round yoke;
   a round plate for fixing the round magnet on the round yoke;
   a round protector installed outside the frame and having a plurality of holes;
   a round vibration plate installed between the round protector and the round plate; and
   a voice coil installed on the vibration plate.

3. The terminal of claim 2, wherein a first fixing portion of the round yoke is insertedly coupled with a coupling jaw formed inside the frame.

4. The terminal of claim 2, wherein external connectors to be connected to the main body of the mobile terminal are formed on the voice coil.

5. The terminal of claim 2, wherein coupling grooves are formed at both sides of the frame, and coupling hooks are formed on the ends of the round protector in order to be inserted into each coupling groove.

6. The terminal of claim 2, wherein a second fixing portion for fixing the round magnet and the round plate is formed on the outside of the round yoke.

7. The terminal of claim 2, wherein the round yoke encloses an outer circumferential surface of the mounting protrusion portion.

8. The terminal of claim 1, wherein the round external speaker unit has a front side and a back side, the back side having the mounting groove portion therein flush with the back side, the mounting groove portion being circular and being configured for coupling the round external speaker unit to the mounting protrusion portion.

9. The terminal of claim 8, wherein the round external speaker unit comprises:
   a frame;
   a round yoke inside the frame, the round yoke including the mounting groove portion on said back side and a round fixing protrusion facing said front side;
   a round magnet within the round fixing protrusion;
   a round plate positioned over the round magnet and within the round fixing protrusion between the round fixing protrusion and the round magnet;
   a round protector outside the frame and having a plurality of holes;
   a round vibration plate between the round protector and the round plate; and
   a voice coil on the vibration plate.

10. The terminal of claim 1, wherein the mounting protrusion portion is elastically transformed when the mounting protrusion portion is inserted into the mounting groove portion.

* * * * *